United States Patent [19]
Wakat

[11] Patent Number: 4,885,203
[45] Date of Patent: Dec. 5, 1989

[54] LIGHTWEIGHT FIRED BUILDING PRODUCTS

[75] Inventor: George H. Wakat, Saint Paul Park, Minn.

[73] Assignee: Applied Ultralight Technologies, Inc., Minneapolis, Minn.

[21] Appl. No.: 68,429

[22] Filed: Jul. 1, 1987

[51] Int. Cl.$^4$ .......................... B05D 3/02; F23M 5/02; B32B 5/16

[52] U.S. Cl. ..................................... 428/220; 110/338; 264/56; 428/313.3; 428/314.4; 428/323; 428/330; 428/332; 428/338; 428/402; 501/141; 501/155

[58] Field of Search ............... 428/404, 407, 323, 328, 428/402, 313.3, 314.4, 338, 332, 330, 220; 501/141, 155; 110/338; 264/56

[56] References Cited

U.S. PATENT DOCUMENTS

| | | | |
|---|---|---|---|
| 4,166,147 | 8/1979 | Lange et al. | 428/407 |
| 4,537,918 | 8/1985 | Parcevaux et al. | 523/130 |
| 4,594,213 | 6/1986 | Ealer | 524/229 |

OTHER PUBLICATIONS

Cenospheres from Dry Fly Ash, by H. Jan de Zeeuw and Roland V. Abresch, 1973.
Reduce Part Weight and Cost with Hollow Microspheres for Plastics, by Dr. Elaine C. Barber, 3M, 1978.

Primary Examiner—George F. Lesmes
Assistant Examiner—James B. Monroe, II
Attorney, Agent, or Firm—Moore & Hansen

[57] ABSTRACT

Brick and tile products are made from a homogeneous mixture of low grade in expensive ceramic microspheres and clay or other binding agent. The microspheres have an axial oxide content under 6 percent by weight and a melting point in excess of the temperature at which brick and tile are fired. The microspheres have random sizes ranging between one third and 200 microns. Brick utilizing the invention is significantly lower in weight and permeability, require much less energy to sinter and less time for firing. Improved thermal and acoustic insulation value is obtained with the invention, and vulnerability to thermal shock is diminished.

38 Claims, No Drawings

LIGHTWEIGHT FIRED BUILDING PRODUCTS

BACKGROUND OF THE INVENTION

Brick and tile products make up a significant segment of the basic structural components utilized by the construction industry. Brick is well established as a long lasting, weather resistant and structurally sound component for both residential and commercial buildings and has changed relatively little in structural properties over the many years it has been in use.

Bricks are used for buildings, pavings, and for decorative surfaces. Other tile products which are commonly used in the building trades, and which are formed of clay as a basic component, include clay pipes, clay tiles, roof tiles, ceramic tile and the like. While the types of clay used for the various bricks and tile differ somewhat, the principal component is clay, which has been appropriately beneficial and mixed with other additives conducive to proper binding, color, texture and the like.

Common brick measures approximately $2'' \times 4'' \times 8''$, and it and other tile products have a typical density of about 120–130 pounds per cubic foot. Brick is not regarded as an effective insulator with its R value of approximately 0.70 for the standard thickness of a dry brick. This insulative factor drops even more when the brick has absorbed significant water as is common due to the high permeability of most unglazed brick.

Brick is manufactured from clay or shale which is subsequently refined and fired in a kiln to produce a hard, polycrystalline building product. While refined clay is the principal solid material for brick manufacture, it is supplemented by grog, minerals, binders and other inorganic oxides, to which water is added. Individual bricks are made by either a soft mud method by which the brick is molded to shape by hand or machine, or by the stiff mud process in which the brick is extruded through a die under high pressure and wire cut to the proper size. After forming, the bricks are dried under controlled conditions in order to keep the brick from breaking during removal of the water. Firing of the bricks is then accomplished by placing the product in a kiln and subjecting it to a thermal process whereby solid state sintering occurs in the 1100 to 1200 degree centigrade range. Clay tiles, pipes and other clay products also undergo similar firing in kilns to achieve the desired polycrystalline composition which produces the desired physical properties of the products.

A major shortcoming of all the described brick and tile products is their substantial weight and the resulting high cost of shipping the product. While the manufacturing cost of brick is relatively low, a point is reached where the cost of shipping adds so much to final delivered cost as to limit the effective marketing area of a manufacturing facility. Some efforts have been made to reduce the weight or density of brick, but the resulting product has had sufficient deficiencies as to greatly restrict its uses and has not been well received commercially. For example, volatile or burnable substances, such as sawdust, have been added to clay mixes so that during thermal processing the sawdust or other substance volatilizes and is driven off as a gas. U.S. Pat. No. 4,123,284 to Konrad C. Rieger summarizes the various efforts to make ceramic bodies lighter and suggests a mechanical agitation method utilizing clay and pyrophyllite as a way to achieve more uniform porosity. The result is an exceptionally porous brick which is lighter, but which is filled with cavities or voids from which the sawdust has been burned away. Such brick is generally softer and less weather resistant than ordinary brick. It is much more vulnerable to water absorption, and if exposed to inclement weather, the voids can fill with water and significantly increase the weight of the brick. In colder climates, such water can freeze and significantly speed up the breaking and degeneration of the brick. With these shortcomings, such brick is not well suited for outdoor use.

The use of lightweight, high quality brick, were it available, could also achieve significant cost reductions and time savings in building construction. For example, an oversized and heavier brick measuring $4'' \times 4'' \times 12''$ and known as "economo" brick is used extensively in commercial construction. Because of its weight, little more than a four foot high section of such economo brick can be constructed without waiting for the mortar to harden, or the brick's great weight produces unwanted settling and sag of the courses. When the four foot height has been reached, workmen must move to a new work site, move scaffolding, brick supplies and mortar to the new site and begin a new section of wall. After the first section has set or hardened, the movement must be reversed and work resumed on the first section. Typically, economo brick is erected in nine foot high sections, with each section being supported on a steel lintel carried by the steel building frame. Accordingly, it would be desirable to have a economo brick which is light enough to be erected in nine foot sections without allowing hardening time for mortar joints. Availability of such a lightweight economo brick would speed up construction and reduce wasted labor costs.

Most modern buildings have rigid, heavy steel framework sized to support the estimated weight of the building and all building components and contents thereof. Were it possible to significantly decrease the weight of the brick and clay tile products, steel framework could be commensurately lighter and less expensive in accord with the reduction in brick weight. For example, were it possible to introduce an acceptable lightweight brick or tile product to replace those now surrounding the elevator shafts of large office buildings, the costs of steel and footings required for the shafts could be reduced by one to two million dollars per building. Further reduction in construction costs would be possible due to lower shipping charges associated with transportation of brick and other fired products.

Another shortcoming of commercially available, unglazed brick is its high porosity and permeability to water. High porosity is undesirable because it permits the brick to absorb water under heavy rainfall or high humidity conditions, and the presence of such water in the brick further increases the significant weight of the brick and further diminishes the marginally adequate insulative properties of the brick. Dry brick is far less heat conductive than wet brick. Face brick having a side to side width of approximately four inches has an R value of approximately 0.4 when dry. The R value may drop still further when the brick has absorbed significant quantities of water. In colder winter climates where R values are important, such high water content also expose the brick to more rapid deterioration from internal ice damage produced by frequently recurring melting and freezing cycles. Accordingly, it is highly desirable that brick be made less permeable.

The present invention provides a sintered polycrystalline building product including brick and other fired products which are dramatically lighter in weight, while having significantly improved thermal and acoustical insulation characteristics and greatly reduced permeability. These goals are accomplished by changing the composition of the fired products by replacing substantial portions of the now used clay with inexpensive, ceramic microspheres having random diameters typically under 200 microns in diameter.

It is known to manufacture hollow glass microspheres, and such spheres have been used in some non brick and non fired products. For example, glass microspheres have been used as a component in auto body filler compounds of the type used in repairing dents and abrasions and as a filler in plastics and joint compound of the type used for dry wall work. Glass microspheres have been added to a cementitious foundational wallboard of the type used as an underlayment for tile. As illustrated in U.S. Pat. No. 4,380,569, glass microspheres have been used in cushions and floor mats. U.S. Pat. Nos. 4,079,162 and 3,045,709 show use of glass microspheres in resins for sound attenuation and thermal insulation, respectively. In U.S. Pat. No. 4,492,732, glass microspheres have been used in curable thermo resins as a lightweight material to fill cavities in boats and aircraft. Such microspheres have been added to powders during flame spraying to create a thermal barrier as described in U.S. Pat. No. 4,303,737. Such glass microspheres have also found utilization as a component in types of particle board for improving thermal and acoustical insulation properties. The glass microspheres would not be usable in sintered products, however, since such glass spheres have softening and melting points well below the temperatures at which brick and tile are fired. Any attempt to use them would produce a poor and unusable brick due to the melting of the microspheres and resulting in the weakening of the brick as the spaces occupied by such spheres collapse or fracture due to excessive pressure buildup within the spheres caused by the heating. Such bricks would be more prone to fracturing and have extensive and sometimes unpredictable shrinkage.

Several companies manufacture high quality ceramic microspheres having melting points above the temperatures required for firing of brick and tile, but the cost of such quality microspheres has been far beyond the range tat would ever permit their use in brick. For example, such ceramic microspheres have been priced at about 83 cents or more per pound in quantities of twenty or more tons and, if used as a major ingredient of common brick, could raise the price of ingredients for each brick by approximately $1.20. There would be little commercial interest in brick were the price of each brick to increase from current levels of thirty to forty cents per brick to $1.50. These commercially available, high quality ceramic microspheres, in tests by this inventor, have also had mixing problems in combining clay with the microspheres and resulted in poor quality brick which cracked badly.

Another source of microspheres has been recognized in recent years with such spheres being discovered in the fly ash residue of many coal burning electric power plants. The microspheres produced at such power plants have been generally regarded as low grade and as a troublesome residue which has often been unused or used for landfill. Such fly ash microspheres are generally regarded as low grade product because they have random characteristics in diameter, wall thickness and other properties. Some of these microspheres are quite heavy for their size and others are hollow and light enough to float on the surface of settling ponds. The residue has been used at times as an extender in epoxy paints and some adhesives. Cement plants which burn coal and thus produce fly ash as a residue have used the residue and the microspheres therein as a filler or additive for cement, but no use has been made of such fly ash and residue that requires the application of high heat, and few commercial applications have been found for them. Such microspheres have not been used for production of brick or other fired building products. The perceived properties of these power plant microspheres have been described in U.S. Pat. No. 4,115,256 and in an article by H. Jan de Zeeuw and Roland V. Abresh entitled, "Cenosoheres From Dry Fly Ash", and presented at the Third International Ash Utilization Symposium in 1973. The present invention utilizes these random characteristic power plant microspheres which the inventor has found to possess average melting points above the temperatures required for firing of brick and tile products. The low grade and random properties of these microspheres make them available at prices well below that of even traditional clays used in brick manufacture, making it feasible to manufacture improved, superior brick and other fired crystalline products at costs comparable to and sometimes lower than traditional fired products formed of clay.

SUMMARY OF THE INVENTION

The invention comprises a substantially improved, lightweight polycrystalline building product having dramatically reduced permeability and greater thermal insulation value. Low cost power plant ceramic microsphere residue consisting of randomly sized microspheres under 200 microns in diameter are combined with traditional clays or other binding agents used in brick and tile manufacture.

The ceramic microspheres obtained from power plant fly ash residue have an average melting temperature which is higher than the temperatures used in firing brick and many tile products and consequently do not collapse and melt during the thermal process. In addition, the wholly closed spheres are impervious to absorption of water and therefore result in a brick or tile product having greatly reduced permeability to water. This permits the production of a low weight brick which is less subject to heavy water absorption and the increased weight from such absorption.

The invention permits the manufacture of lightweight bricks which are dramatically less expensive to ship, thereby increasing the marketing range of manufacturers. It permits the economic development and production of lightweight ceramic tile, and the reduced cost of shipping such tile will open distant overseas markets to American tile manufacturers. Cost savings produced by the invention will allow American manufacturers to better compete in the ceramic tile market in the United States, which has been heavily dominated by foreign manufacturers.

The cost of firing brick and tile products embodying the invention is less than that associated with the firing of conventional tile and brick clay compositions because less energy is needed to fire the lower density bricks disclosed herein. It is estimated that for each pound of clay replaced by ceramic microspheres, approximately 500 BTU's of heat energy can be saved, and accordingly, bricks embodying the invention will save approximately 1100 to 1300 BTU's for each brick provided.

A further advantage resulting from the invention is that brick and tile products will be more resistant to thermal shock. Because of the insulative properties of the microspheres, building materials at low temperatures will not be as vulnerable to breakage due to sudden expansion resulting from exposure to higher temperature.

These and other objects and advantages of the invention will appear more fully from the following description.

DESCRIPTION OF THE PREFERRED EMBODIMENTS

An improved lightweight brick and a series of other fired polycrystalline products such as various tiles can be manufactured by formulating the component mixture for the product with a major portion of the traditional clays utilized therein being replaced by ceramic microspheres of the type described in detail hereafter.

The term, "fired polycrystalline building product", as used herein, refers to all types and sizes of non-refractory brick, including common brick, face brick, hollow brick, economo brick and the like and also includes other fired products having a refined clay composition which can be replaced by the microspheres including inter alia roof tile, drain tile, ceramic wall tile and pipes.

While specific proportions of refined clay and ceramic microspheres are described hereafter as being workable embodiments of the invention, it should be understood that replacement of any proportion of the clay now used in commercial brick and other fired polycrystalline building products by the ceramic microspheres will decrease the weight and permeability of the product, decrease the product's manufacturing costs, and improve its thermal properties. It has been found desirable to replace a major portion of the clay with ceramic microspheres, such proportion of microspheres being as high as ninety percent by volume, although other lower proportions may be more suitable for most brick applications. For example, a workable mix might consist of seven parts ceramic microspheres by volume and three parts clay or other binding medium suitable for causing the microspheres to adhere together as an integral unit when properly formed and fired. Water is added to the mix in quantities adequate to produce the desired degree of plasticity required for molding and typically forms 8-18% by weight of the powder water mix. The same basic clay and other additives used in making conventional brick and tile may be used as a binding medium with ceramic microspheres and forms an acceptable binder for providing the necessary adhesive bond between the components.

The ceramic microspheres found desirable for use with the invention are inexpensive and are formed as a residue byproduct of coal burning electric power plants. The microspheres are formed during the electric power generation process and emitted from power plant furnaces as part of a fly ash residue. Typically, such residue is collected in settling ponds adjacent to the power plants, with heavier microspheres settling to the bottom of the pond and other lighter microspheres floating on its surface. Ceramic microspheres formed at such power plants have a wide range of diameters but typically are between one third micron to two hundred microns. Some microspheres are hollow, while others are solid. The wall thicknesses of such microspheres vary from sphere to sphere, and the microspheres generated in coal burning plants in the United States are, within limits, quite random in size and weight.

It should be understood that depending on a power plant's geographic location and the type of coal deposits available to it, its residue products differ in ceramic and microsphere content. Plants burning only bituminous coal produce residue containing the highest content of usable ceramic microspheres. As the quality of coal decreases, the microsphere content decreases. Anthracite coal produces fewer microspheres than bituminous coal and lignite produces substantially no microspheres. Accordingly, the present invention is best utilized with residues formed from coals having a higher bituminous content.

Because of the generally random characteristics of power plant ceramic microspheres and their resulting variation from batch to batch and plant to plant, it is appropriate to characterize them in terms of their average properties. Such ceramic microspheres have an average melting temperature between 1200 and 1300 degrees centigrade, and an average bulk density when dry ranging between 23 and 55 pounds per cubic foot. When such microspheres are predominantly hollow, as is the case with those that float on settling ponds, the average bulk density is lower and on the order of 11 to 30 pounds per cubic foot. Ceramic microspheres having an average bulk density of 25-35 lbs. per cubic foot are available in large quantities from many coal burning power plants and produce an excellent grade of brick and tile products.

The ceramic microspheres which function well as a component of fired polycrystalline building products have a low alkali oxide content. The term, "alkali oxides", as used herein includes lithium oxide, potassium oxide and sodium oxide. In order that the melting point of the ceramic microspheres be maintained at 1200-1300 degree centigrade or above, the total weight of the alkali oxides present in the microspheres must not exceed six percent of the weight of the microspheres. Accordingly, the total weight of all alkali oxides in the microspheres, such as lithium oxide, potassium oxide and sodium oxide, taken individually or in combination, must not exceed six percent of the weight of the ceramic microspheres used.

It should be understood that six percent is near the upper limit for such alkali oxide composition, and microspheres having lower alkali oxide contents, even as low as zero content, are usable and are within the purview of the invention.

It will be appreciated that because the ceramic microspheres are wholly closed and have a ceramic, almost glass-like surface character, they are substantially impermeable and subsequently absorb little or no water. Bricks and fired products having a volume composition of sixty to ninety percent by volume of such microspheres is largely incapable of absorbing water into the volume occupied by the microspheres. Only the remaining interstitial spaces which are filled with traditional refined clay or other binding agent are significantly vulnerable to the absorption of water, and these spaces occupy such reduced amounts of volume as to provide negligible difficulties when they do absorb water. In fact, where brick, tile and products which will interact with mortar are involved, it is essential that some water be absorbable into the interstitial spaces so as to provide better interaction with mortar, cement or the like when the bricks or tiles are laid in their courses. The mullite which forms during sintering and which fills the interstitial spaces allows a wicking action which allows water to enter the brick and aids in forming an adhesive bond when mortar or cement is applied to join adjacent bricks together The term, "binding agent", as used herein is intended to include any known mixture of ingredients suitable for forming an adhesive binder which can fill the interstitial spaces between individual ceramic microspheres and which, when properly dried and subsequently sintered in a kiln, will result in a hard, polycrystalline building product. While refined clay is usually the major ingredient in such binding medium, it should be understood that shale, cement, lubricating agents or any other material or combination of materials known to the art and usable as a binder in the manufacture of brick or other fired ceramic products, may be substituted and is within the purview of the invention.

In manufacturing brick or other fired crystalline building products in accord with the invention, a dry mixture of ceramic microspheres and binding agent is first prepared. The ceramic microspheres and binding agent are then thoroughly mixed to provide a generally homogeneous mixture, with the interstitial spaces between the various microspheres being filled with the binding medium which will typically be predominantly traditional brick forming refined clay. After a homogeneous mixture has been obtained, an appropriate quantity of water is added to the mixture to form a plastic and pliable mud, which can then be either formed into appropriately sized brick or tile using either the soft mud or stiff mud process. The amount of water added is determined by the degree of plasticity required so as to properly form or extrude the mixture into individual bricks, but will generally be in the range of 8-18% by weight of the brick mixture.

In sintering or firing brick or other products which embody the invention, it has been found that the utilization of substantial proportions of ceramic microspheres significantly reduces the amount of energy required to drive off the water content and harden the product. Traditional brick, manufactured largely of clay and other known components, requires a large and predictable amount of heat to bring the clay material to a state of final crystalline hardness. Typically, the brick or other product is sintered at 1100°-1200° centigrade. Fired clay has a specific heat of approximately 0.25 BTU/lb°F. The specific heat of products embodying the invention is approximately the same as that of traditional brick but because the ceramic microsphere products are significantly lighter, typically 30-40 percent lighter, it will require only about 30-40 percent as much heat to process the lower density product. This translates to large reductions in the energy needed to mass produce the new brick. It is estimated that the energy saving realized is on the order of 500 BTU's for each pound of brick utilizing the invention and savings of 1100-1300 BTU's for each brick. It will be appreciated that with the tons of material which are heated and transformed to brick, considerable quantities of energy can be saved by utilizing ceramic microspheres in place of clay and, accordingly, production manufacturing costs can be significantly decreased. Since each brick requires less heat energy for sintering, the amount of time required to fire each brick at conventional kiln temperatures of 100°-1200° C. is reduced. Consequently, when brick embodying the invention is moved continuously through a heated tunnel kiln, its residence time can be reduced and a greater number of brick can be cycled through the kiln in a given time period. This results in the production of larger quantities of brick in a given time without increasing energy consumption.

Bricks embodying the invention have been manufactured with excellent results in accord with the table below. Brick types 1-4 embody the invention and are compared therein with other commercially available brick. The proportions of ceramic microspheres and clay used in brick types 1-4 represent volume measurements in which, as set out for brick type 1, the brick is made of a mixture consisting of seven parts by volume of ceramic microspheres and three parts by volume of traditional refined clay or other binding agent. The use of ceramic microspheres has no significant effect on the coloration of the mixture, and color is defined by the clay per se or by the addition of specific pigments.

|  | % Clay By Volume | % Ceramic Microspheres By Volume | Density lbs/cuft | Weight of Brick/lbs |
|---|---|---|---|---|
| Brick Type 1 | 50% | 50% | 79 | 2.6 lbs. |
| Brick Type 2 | 30% | 70% | 53 | 1.9 lbs. |
| Brick Type 3 | 20% | 80% | 50 | 1.8 lbs. |
| Brick Type 4 | 10% | 90% | 48 | 1.7 lbs. |
| Face Brick | 100% | 0 | 130 | 4.2 lbs. |
| Common Brick | 100% | 0 | 120 | 3.9 lbs. |

Even when only seventy percent of the clay of traditional brick has been replaced by ceramic microspheres, the density of the new brick is approximately 53 pounds per cubic foot, as compared with 130 pounds per cubic foot for face brick. Hence, a brick embodying the invention and having the described 30-70 composition, can have an individual weight of approximately 1.9 lbs. rather than the approximate 4.2 lbs. associated with a face brick.

A brick embodying the invention and having nine parts ceramic microspheres by volume and one part clay or binding medium by volume results in brick having a density of approximately 48 pounds per cubic foot and an individual brick weight of 1.7 lbs.

Crush tests of brick embodying the invention and conducted on handmade brick samples indicate that load bearing ability is at least equivalent to and generally greater than traditional brick products.

For most structural applications, the optimum composition of the improved brick will comprise a mixture having between 65 and 85% ceramic microspheres by volume. It is believed that the best general, overall characteristics are obtained when the brick has a microsphere content between 70 and 80% by volume. The volume of a typical common brick is approximately 64 cubic inches. If that volume were filled solely with ceramic microspheres with the spheres stacked in an orderly matrix and all spheres having the same diameter, particle packing theory predicts that spheres will fill 74% of the volume of the brick. The remaining 26% represents the volume of the interstitial spaces between the spheres. Accordingly, a desirable mixture for brick might be 74% microspheres and 26% clay or binding medium for a mixture in which all spheres are of uniform diameter. However, since the spheres are not of uniform size, stacking will be less uniform and interstitial spaces will at times fill with smaller microspheres. For these reasons, a binding medium content of 20-30% will produce bricks having a desirable compromise between light weight and uniformity of strength and composition. Where lighter weight becomes a greater consideration, the binding medium content can increase to the 25% to 35% level by weight while still maintaining high levels of strength.

While the specific compositions in the table are usable for the manufacture of brick, it should be understood that they can also be used for other fired, crystalline products including various tile products and other types of brick. It is contemplated that many different volume compositions of the mixture are usable to satisfy specific building requirements, and are within the purview of the invention.

The insulative value of bricks embodying the invention as a result of the hollow spheres used therein is significantly higher than common brick. Brick utilizing the invention has an R value of approximately 1.5 for the 4— thickness of a standard, traditional brick; common brick has an R value of approximately 0.70. These R values are representative when the brick is substantially dry throughout its thickness. When the bricks are subjected to permeability tests, such as immersion of the brick in water for 48 hours, it is found that each brick absorbs water and will absorb enough water to increase its weight by approximately fifteen to eighteen percent. Because the brick embodying the invention is significantly lighter due to much of its composition being impermeable, only the clay content of the improved brick tends to absorb significant quantities of water. As a result, a common brick will absorb approximately 0.5 pounds of water over a 48 hour immersion test, while the improved brick absorbs approximately 0.3 pounds of water. The improved insulative properties also result in a brick which is more acoustically effective, transmits less sound and is more resistent to thermal shock.

Accordingly, brick embodying the invention has an insulative factor which is approximately twice that of common brick, is less permeable and less subject to water absorption, thereby better maintaining its insulative factor and providing a more effective product where needed.

A further advantage resulting from the invention is that the brick forming mixture, with its large proportion of ceramic microspheres, is easier to manipulate and extrudes from brick forming dies in smoother, more plastic fashion, without the addition of significant quantities of lubricating agent.

Because of the significant quantities of ceramic microspheres which are available from domestic coal burning power plants, the per ton cost of such residue is less than that of many traditional refined clay material used in brick, permitting a further cost reduction in manufacturing.

Because of the dramatically reduced weight of the improved brick, construction projects will need significantly reduced quantities of steel support framing thereby reducing the overall cost of construction. Lightweight economo brick can be made and erected into nine foot heights, thereby making it possible to erect an entire story without interruption and eliminating the burdensome, costly and time consuming practice of building such economo brick walls in sections interrupted by scaffold movements and reassignment of work crews.

While the preferred embodiments of the present invention have been described, it should be understood that various changes, adaptions and modifications may be made therein without departing from the spirit of the invention and the scope of the appended claims.

What is claimed is:

1. A fired, polycrystalline building product sintered to hardness in a kiln to a predetermined product temperature and formed of a substantially homogeneous combination comprising water and a mixture of binding medium and ceramic microspheres obtained from fly ash residue produced as a result of coal combustion, said microspheres having a melting point in excess of said product temperature, said microspheres having an alkali oxide content wherein the total weight of said alkali oxide content does not exceed 6% of the weight of said microspheres.

2. The fired, polycrystalline building product of claim 1 wherein said microspheres are of random diameter and have diameters predominantly under two hundred microns.

3. The fired polycrystalline building product of claim 2 wherein said microspheres have a range of diameters between one third micron and 200 microns.

4. The fired, polycrystalline building product of claim 1 wherein said microspheres have an average melting temperature between 1200 and 1300 degrees centigrade.

5. The fired, polycrystalline building product of claim 1 wherein said product is economo brick having a unit size of 4"×4"×12".

6. The fired, polycrystalline building product of claim 1 wherein said alkali oxide content comprises at least one compound selected from the group of alkali oxide compounds consisting of lithium oxide, potassium oxide and sodium oxide.

7. The fired, polycrystalline building product of claim 1 wherein said microspheres have an average bulk density of between 23 and 55 pounds per cubic foot.

8. The fired, polycrystalline building product of claim 1 wherein said microspheres are predominantly hollow, and have an average bulk density of 25 to 35 pounds per cubic foot.

9. The fired, polycrystalline building product of claim 1 wherein said mixture of said microspheres and said binding agent has a volume content of microspheres which is between 50 and 90 percent of said mixture prior to sintering.

10. The fired, polycrystalline building product of claim 1 wherein said mixture of said microspheres and said binding agent has a volume content of between 65-85 percent microspheres prior to sintering.

11. The fired, polycrystalline building product of claim 1 wherein said mixture of said microspheres and said binding agent has a volume composition of between 70 and 80 percent microspheres prior to sintering.

12. The fired, polycrystalline building product of claim 1 wherein said mixture of said microspheres and said binding agent has a volume composition of substantially nine parts microspheres and one part binding medium prior to sintering.

13. The fired, polycrystalline building product of claim 1 wherein said product is common brick.

14. The fired, polycrystalline building product of claim 1 wherein said product is tile.

15. The fired polycrystalline building product of claim 1 wherein said microspheres are of random diameters with an average melting point above 1200 degrees centigrade.

16. The fired polycrystalline building product of claim 15 wherein said diameters are under 200 microns.

17. A fired, polycrystalline building product sintered to hardness in a kiln to a predetermined product temperature and formed of a substantially homogeneous combination comprising water and a mixture of binding medium and ceramic microspheres obtained from flyash residue, said microspheres having a melting point in excess of said product temperature and having an alkali oxide content wherein the total weight of said alkali oxide content does not exceed 6% of the weight of said microspheres.

18. The fired, polycrystalline building product of claim 17 wherein said mixture of said microspheres and said binding agent has a volume composition of substantially nine parts microspheres and one part binding medium prior to sintering.

19. The fired, polycrystalline building product of claim 17 wherein said product is common brick.

20. The fired, polycrystalline building product of claim 17 wherein said product is tile.

21. The fired, polycrystalline building product of claim 17 wherein said microspheres are of random diameters with an average melting point between 1200° and 1300° centigrade.

22. The fired, polycrystalline building product of claim 17 wherein said microspheres have an average melting temperature between 1200° and 1300° centigrade.

23. The fired, polycrystalline building product of claim 17 wherein said alkali oxide content comprises at least one compound selected from the group of alkali oxide compounds consisting of lithium oxide, potassium oxide and sodium oxide.

24. The fired, polycrystalline building product of claim 17 wherein said mixture of said microspheres and said binding agent has a volume content of microspheres which is between 50% and 90% of said mixture prior to sintering.

25. The fired, polycrystalline building product of claim 17 wherein said mixture of said microspheres and said binding agent has a volume of between 65% and 85% microspheres prior to sintering.

26. The fired, polycrystalline building product of claim 17 wherein said mixture of said microspheres and said binding agent has a volume composition of between 70% and 80% microspheres prior to sintering.

27. A fired, polycrystalline brick product sintered to hardness in a kiln to a predetermined product temperature and formed of a substantially homogeneous combination comprising water and a mixture of binding medium and ceramic microspheres obtained from flyash residue, said microspheres having a melting point in excess of said predetermined temperature and having an alkali oxide content wherein the total weight of said alkali oxide content does not exceed 6% of the weight of said microspheres.

28. The fired, polycrystalline brick product of claim 27 wherein said microspheres are predominantly hollow, and have an average bulk density of 25 to 35 pounds per cubic foot.

29. The fired, polycrystalline brick product of claim 27 wherein said mixture of said microspheres and said binding agent has a volume content of microspheres which is between 50% and 90% of said mixture prior to sintering.

30. The fired, polycrystalline brick product of claim 27 wherein said microspheres are of random diameters with an average melting point between 1200° and 1300° centigrade.

31. The fired, polycrystalline brick product of claim 27 wherein said alkali oxide content comprises at least one compound selected from the group of alkali oxide compounds consisting of lithium oxide, potassium oxide and sodium oxide.

32. The fired, polycrystalline brick product of claim 27 wherein said microspheres have an average bulk density of between 23 and 55 pounds per cubic foot.

33. A fired, polycrystalline tile product sintered to hardness in a kiln predetermined temperature and formed of a substantially homogeneous combination comprising water and a mixture of binding medium and ceramic microspheres obtained from flyash residue, said microspheres having a melting point in excess of said temperature and having an alkali oxide content wherein the total weight of said alkali oxide content does not exceed 6% of the weight of said microspheres.

34. The fired, polycrystalline tile product of claim 33 wherein said microspheres have an average bulk density of between 23 and 55 pounds per cubic foot.

35. The fired, polycrystalline tile product of claim 33 wherein said mixture of said microspheres and said binding agent has a volume content of microspheres which is between 50% and 90% of said mixture prior to sintering.

36. The fired, polycrystalline tile product of claim 33 wherein said microspheres are of random diameters, with an average melting point between 1200° and 1300° centigrade.

37. The fired, polycrystalline tile product of claim 36 wherein said diameters are predominantly under 200 microns.

38. The fired, polycrystalline tile product of claim 33 wherein said alkali oxide content comprises at least one compound selected from the group of alkali oxide compounds consisting of lithium oxide, potassium oxide and sodium oxide.

* * * * *